United States Patent [19]

Haas et al.

[11] Patent Number: 4,535,004

[45] Date of Patent: Aug. 13, 1985

[54] CONSOLIDATING THE SURFACE OF A GRANULAR ADSORBENT

[75] Inventors: Franz Haas; Gerhard Janisch; Gerold Schreyer, all of Ludwigshafen, Fed. Rep. of Germany

[73] Assignee: BASF Aktiengesellschaft, Ludwigshafen, Fed. Rep. of Germany

[21] Appl. No.: 473,600

[22] Filed: Mar. 9, 1983

[30] Foreign Application Priority Data

Mar. 31, 1982 [DE] Fed. Rep. of Germany ....... 3211900

[51] Int. Cl.$^3$ .......................... B05D 3/02; B05D 7/00
[52] U.S. Cl. .................................. 427/212; 427/221; 427/385.5; 428/407
[58] Field of Search ................... 427/221, 212, 385.5; 428/407

[56] References Cited

U.S. PATENT DOCUMENTS

| | | | |
|---|---|---|---|
| 2,988,782 | 6/1961 | Parrish et al. | 264/69 |
| 3,544,507 | 12/1970 | Lloyd | 428/407 X |
| 4,081,402 | 3/1978 | Levy et al. | 424/78 X |
| 4,112,185 | 9/1978 | Meiller | 428/403 |
| 4,171,283 | 10/1979 | Nakashima et al. | 604/126 X |

FOREIGN PATENT DOCUMENTS 2063228 6/1981 United Kingdom .

*Primary Examiner*—Michael R. Lusignan
*Attorney, Agent, or Firm*—Oblon, Fisher, Spivak, McClelland & Maier

[57] ABSTRACT

A process for consolidating the surface of a granular adsorbent, wherein thermoplastic crosslinkable bonding fibers are applied from aqueous suspension, the water taken up by the adsorbent is evaporated off and the bonding fibers adhering to the surface of the adsorbent are crosslinked by heating. The adsorbent thus treated has virtually the same adsorption and desorption properties as the untreated adsorbent, but exhibits substantially improved abrasion resistance.

5 Claims, No Drawings

CONSOLIDATING THE SURFACE OF A GRANULAR ADSORBENT

Adsorbents, for example active carbons, which are mostly employed in granular form in industrial adsorption processes, as a rule tend to dust, especially under mechanical load, such as arises on filling the adsorbent into an adsorption apparatus or, especially, on using the adsorbent in an agitated bed. The abrasion which occurs under such mechanical load can greatly interfere with subsequent process steps. In particular, such abrasion can make it virtually impossible to employ many of the granular adsorbents in an agitated bed.

It is an object of the present invention to consolidate the surface of a granular adsorbent so that abrasion which occurs under mechanical load, especially in an agitated bed, is at least greatly reduced.

We have found that this object is achieved, according to the invention, if the adsorbent, which initially contains virtually no water, (1) is treated, while being mixed, with an aqueous suspension containing from 1 to 30% by weight of filamentous structures of self-crosslinking copolymers, in such a way that the granular adsorbent takes up water from the suspension and at the same time the suspended filamentous structures deposit on the surface of the adsorbent, the latter remaining free-flowing, (2) the water taken up by the adsorbent is evaporated and (3) the adsorbent covered with the filamentous structures is heated at 110–180° C. in order to crosslink the copolymer.

Granular adsorbents which are of industrial importance and whose surface can be consolidated in accordance with the invention include, for example, carbon-containing adsorbents, such as active carbon, active coke and carbon molecular sieves, active aluminas, obtained, for example, by dehydrating and calcining aluminum hydroxide, silica gels and molecular sieve zeolites which are derived from natural or synthetic hydrated aluminosilicates of monofunctional or polyfunctional bases. Active carbons are preferred amongst the granular adsorbents. The inner surface area of the active carbon is in general from 400 to 1,600 m$^2$/g, while the inner surface area of the other adsorbents is from 100 to 1,000 m$^2$/g.

The mean particle diameter of the granular adsorbents is from 0.5 to 9, preferably from 2 to 5, mm.

In order to consolidate the surface of the granular adsorbent, it is first covered in a network-like manner with a filamentous, thermoplastic copolymer which is self-crosslinking, and thereafter the material thus treated is heated at a temperature at which the copolymer crosslinks and thereby ceases to be thermoplastic.

Filamentous, self-crosslinking copolymers, which may also be referred to as fibrids or fibrils may be prepared, for example, by conventional methods from dispersions of self-crosslinking copolymers.

The characteristic feature of these copolymers is the presence of groups which on heating at 110–180° C. react with one another to cause crosslinking, for example carboxyl groups and acrylamide or methacrylamide groups, such as are present, eg., in copolymers which contain an ethylenically unsaturated carboxylic acid and acrylamide or methacrylamide as copolymerized units. Further examples of groups which cause crosslinking are N-methylol and/or N-methylol-ether groups; comonomers which contain these groups are especially N-methylolamides of α, β-monoolefinically unsaturated monocarboxylic and/or dicarboxylic acids of 3 to 5 carbon atoms, especially N-methylolacrylamide, N-methylolmethacrylamide and N-methylolfumarodiamide, as well as the corresponding ethers, eg. N-alkoxymethylamides of monoolefinically unsaturated monocarboxylic and dicarboxylic acids, where alkyl is of 1 to 4 carbon atoms, eg. N-methoxymethylacrylamide, N-methoxymethylmethacrylamide, N-ethoxymethylmethacrylamide, N-n-butoxymethylacrylamide and N-isopropoxymethylmethacrylamide. In general the copolymers contain from 0.5 to 10, especially from 1 to 6, % by weight of such crosslinking monomers, as copolymerized units. Additionally, the copolymers may also contain from 0 to 5% by weight of monoolefinically unsaturated carboxylic acids of the stated type, eg. acrylic acid and/or methacrylic acid and/or their amides, as copolymerized units.

The copolymers contain, as copolymerized units, the following monomers, or mixtures of these monomers, as main constituents: styrene, acrylonitrile, vinylchloride, vinylidenechloride, vinyl esters of saturated $C_1$–$C_4$-carboxylic acids, acrylic acid esters and methacrylic acid esters of monohydric $C_1$-$C_{12}$-alcohols, methacrylonitrile and buta-1,3-diene, as well as mixtures of styrene and butadiene, styrene and acrylonitrile, styrene and methacrylonitrile, butadiene and acrylonitrile or methacrylonitrile, styrene and an acrylate or methacrylate ester, vinyl acetate and an acrylate or methacrylate ester, or styrene, an acrylate ester and acrylonitrile. This group of monomers accounts for 90–99.5% by weight of the copolymer structure.

The copolymers are prepared, by conventional methods, in the form of aqueous dispersions of about 40–55% strength by weight, which, because of the process of preparation, contain conventional assistants, such as anionic or nonionic emulsifiers. Such self-crosslinking polymer dispersions are commercially available.

In order to produce fibers (or fibrids or fibrils) from such a dispersion, its viscosity is increased by adding a thickener. The thickened dispersion contains 0.05–10, preferably 0.2–5, % by weight of a high molecular weight synthetic thickener, for example a high molecular weight polymer produced by copolymerizing acrylic acid or methacrylic acid with from 0.5 to 10% by weight of compounds which contain two or more ethylenically unsaturated double bonds, eg. divinyldioxane, divinylbenzene or the triallyl ether or tetraallyl ether of sorbitol or fructose. Other suitable thickeners are high molecular weight polyacrylamide and high molecular weight polyethylene oxides.

Another group of polymer dispersions suitable for the preparation of fibrils or fibrids comprises dispersions of self-crosslinking polymers which thicken under shearing stress, ie. under conditions which prevail in the preparation of the fibrils or fibrids. Such dispersions are disclosed, for example, in European patent application No. 43,464. They exhibit dilatant flow within a certain concentration range, ie. they thicken under mechanical load, in other words their viscosity increases with increasing shear, without there being a measurable time-dependence. The polymers in these dispersions contain, as copolymerized units, from 1 to 10% by weight of α, β-monoolefinically unsaturated monocarboxylic and/or dicarboxylic acids of 3 to 5 carbon atoms together with other monoolefinically unsaturated monomers and with from 0 to 5% by weight of polyolefinically unsaturated monomers. They are to be regarded as self-crosslinking if they contain, as other monoolefinically unsaturated monomers, as little as 1–10% by weight of an amide of an ethylenically unsaturated carboxylic acid, such as acrylamide or methacrylamide, as copolymerized units. Amongst these dispersions, those which are preferred for consolidating the surface of a granular adsorbent contain, as other monoolefinically unsaturated monomers, from 0.5 to 10% by weight of N-methylolamides of ethylenically unsaturated carboxylic acids of 3 to 5 carbon atoms or their etherification products, alongside such monomers as styrene, acrylonitrile, acrylate esters, methacrylate esters, vinylchloride, vinylidenechloride and vinyl esters. The dilatant dispersions are obtained, according to European patent application No. 43,464, by copolymerizing the monomers in aqueous emulsion at near the glass transition point of the resulting copolymer (the copolymerization being accompanied by agglomeration, with only partial fusion of the initially formed polymer particles of 5–200 nm diameter), and then adjusting the copolymer content of the resulting aqueous copolymer dispersion to 35–55% by weight and the pH to 3–5, or replacing the water entirely or partially by a water-miscible solvent which does not dissolve or swell the copolymer.

The preparation of the filamentous products (fibrils or fibrids) from the thickened, self-crosslinking copolymer dispersions described above or from the dilatant copolymer dispersions, also containing self-crosslinking groups, is carried out in a conventional manner by bringing a polymer dispersion containing an anionic or nonionic dispersant together with an aqueous solution of a cationic precipitant or precipitation bath, under the influence of shearing forces. The principle of the process is disclosed, for example, in U.S. Pat. No. 2,988,782 and British Pat. No. 1,461,794. The process for the preparation of thermoplastic, crosslinkable bonding fibers, or fibrids or fibrils, is the subject of our earlier European patent application No. 82 106 302.1, which is herewith incorporated by reference. Suitable cationic precipitation baths are aqueous solutions containing about 0.5–10, preferably 1–5, % by weight of a high molecular weight or low molecular weight substance, for example aqueous solutions of condensates of polyamines and dicarboxylic acids, which have been crosslinked with epichlorohydrin (to give polyamido-amino-epichlorohydrin resins) and been neutralized with acids, eg. sulfuric acid, phosphoric acid, as well as solutions of neutralized polyethyleneimines or of alkylarylammonium salts, eg. trimethylbenzylammonium chloride.

Using the process described above, fibers are obtained from dispersions of thermoplastic, self-crosslinking copolymers. These fibers, also referred to as fibrils or fibrids, have a diameter of from 0.3 to 1, preferably from 0.3 to 0.6, mm and a length of from 0.5 to 12, preferably from 1 to 6, mm.

The fibers may be employed directly, in the form of the suspensions obtained from the preparation of the fibers, for consolidating the surface of a granular adsorbent. The suspensions contain from 1 to 30, preferably from 10 to 15, % by weight of the thermoplastic, crosslinkable fibers. The virtually dry, granular adsorbent is treated, while being mixed, with the aqueous suspension of the filamentous structures of self-crosslinking copolymers, described above. Preferably, the fiber suspension is poured onto the adsorbent, which is being stirred or otherwise agitated or turned over. During this treatment, the adsorbent remains free-flowing. The amount of aqueous fiber suspension relative to granular adsorbent is so chosen that the degree of water saturation of the adsorbent is at most 80% by weight. In this way, a granular adsorbent covered in a network-like manner with thermoplastic, crosslinkable fibers is obtained. In a preferred embodiment of the preparation of such network-like coatings, a granular adsorbent which already contains water is used or the adsorbent is first sprayed with water, uniform distribution of the water being ensured by stirring or shaking the adsorbent. The amount of water thus applied is from 1 to 20, preferably from 5 to 10, % by weight of the amount which the granular adsorbent can take up to fill the inner pores and channels completely. The saturation amounts differ for individual adsorbents. For example, some granular types of active carbon can take up 1 part by weight of water per part by weight of carbon, so as to fill the inner pores and channels of the carbon completely with water, and nevertheless remain free-flowing.

A treatment of the granular adsorbent with water before treatment with the fiber suspension is especially relevant if a fiber suspension containing 15–30% by weight of fibers is used to produce the network-like fiber coating on the adsorbent. The weight ratio of fibers to granular adsorbent coated with the fibers is from about 2:98 to 30:70, preferably from 3:97 to 10:90.

After the adsorbent has been treated with the fiber suspension, the water which the adsorbent has taken up is removed. This process step is carried out either under atmospheric pressure and at above 100° C. or under reduced pressure at from room temperature to 100° C., or by other conventional drying methods. If the fiber-coated adsorbent is not heated at above 110° C. for a lengthy period to remove the water, the copolymers constituting the fibers remain thermoplastic. Evaporation of the water from the adsorbent is necessary to prevent complete covering of the pores or channels on the surface of the adsorbent with filamentous copolymer particles during heating at the crosslinking temperature of the copolymer.

In a further process step which is carried out independently of the evaporation of the water from the adsorbent, or, preferably, directly following this drying step, the copolymer which adheres as a network or porous coating to the surface of the granular adsorbent is crosslinked. To do so, the coated granular adsorbent is heated at 110°–180° C., preferably 120–150° C. After the heat treatment, the copolymers are firmly anchored to the adsorbent, are no longer fusible and are insoluble in organic solvents, for example benzene, toluene or chlorohydrocarbons.

The novel process gives granular adsorbents whose surfaces are excellently consolidated without significant impairment of the adsorbency. On the other hand, the treatment produces an exceptionally great reduction in abrasion, so that the granular adsorbents produced according to the invention can be employed for adsorption in an agitated bed.

In the Examples which follow, parts and percentages are by weight.

PREPARATION OF THE SUSPENSIONS OF FILAMENTOUS STRUCTURES (FIBRIDS)

Suspension 1

Fibrid suspension 1 was prepared in accordance with German patent application No. P 31 28 871.5 by introducing a mixture of (a) 220 parts of an anionic 45% strength aqueous dispersion of a copolymer of 53% of n-butyl acrylate, 29% of styrene, 13% of acrylonitrile, 4% of N-methylolmethacrylamide and 1% of acrylic acid, (b) 18 parts of water and (c) 2 parts of a 25% strength aqueous solution of a high molecular weight sodium polyacrylate into a cationic precipitation bath in which the stringy mixture of (a)-(c) was coagulated and sheared. The cationic precipitation bath was an 0.6% strength aqueous polyethyleneimine solution. Using a rotating disc conventionally employed for defibration, fibrids having a mean diameter of 0.5-1 mm and an average length of 3-5 mm were obtained. After the fibers had settled out, sufficient water was decanted to bring the fiber concentration in the suspension to 10%.

Suspension 2

To prepare the 10% strength aqueous suspension 2 by the method described above for suspension 1, the dispersion used for suspension 1 was replaced by a 50% strength aqueous dispersion of a copolymer of 50% of butadiene, 40% of styrene, 5% of acrylic acid and 5% of N-methylolmethacrylamide.

Suspension 3

This suspension was prepared like suspension 1, but instead of the dispersion used there a 40% strength aqueous dispersion of a copolymer of 65% of butadiene, 30% of acrylonitrile and 5% of N-methylolacrylamide was employed.

Suspension 4

This suspension was prepared like suspension 1, but instead of the dispersion used there a 50% strength aqueous dispersion of a copolymer of 80% of vinyl acetate, 17% of n-butyl acrylate and 3% of N-methylolacrylamide was employed.

Suspension 5

This suspension was prepared like suspension 1, but (a) instead of the dispersion used there a 50% strength dispersion of a copolymer of 80% of styrene, 12% of ethyl acrylate, 3% of acrylic acid, 3% of N-methylolmethacrylamide and 2% of maleic acid, at a critical shearing rate of about 5 sec$^{-1}$ was used at room temperature, while (b) an 0.25% strength aqueous solution of ethyl acrylate/diethylaminoethyl acrylate was used in place of the aqueous polyethyleneimine solution.

EXAMPLE 1

110 parts of the 10% strength aqueous suspension 1 were poured at room temperature, with slow stirring, over 100 parts of a virtually dry active carbon which had a mean particle diameter of 4 mm and an inner surface area of 1,300 m$^2$/g; the granular active carbon rapidly took up the water and the fibrids formed a coating on the surface of the carbon.

The resulting coated granular active carbon was then dried in a stream of air at 140° C., while being turned repeatedly; the water taken up evaporated and the copolymer crosslinked. The drying and crosslinking process required 5 minutes. The coated granular active carbon thus obtained had a fiber:carbon weight ratio of 10:90.

The adsorption and desorption properties of the coated granular active carbon corresponded virtually to those of the active carbon, of the same particle size, used as the starting material. On the other hand, the abrasion of the coated carbon was surprisingly less.

EXAMPLE 2

75 parts of the 10% strength aqueous suspension 2 were poured at room temperature, with slow stirring, over 100 parts of a virtually dry active carbon which had a mean particle diameter of 4 mm and an inner surface area of 900 m$^2$/g. The granular active carbon rapidly took up the water, while the fibrids from the suspension formed a coating on the surface of the carbon. The resulting coated granular active carbon was then dried in a stream of air at 150° C., while being turned repeatedly; the water taken up evaporated and the polymer crosslinked. The drying and crosslinking process required 4 minutes. The coated granular active carbon thus obtained had a fiber:carbon weight ratio of 7:93.

EXAMPLE 3

100 parts of a virtually dry active carbon which had a mean particle diameter of 4 mm and an inner surface area of 1,500 m$^2$/g were sprayed, at room temperature, with 10 parts of water. During spraying, the granular particles were mixed thoroughly so that the water was able to become uniformly distributed on the active carbon. 45 parts of suspension 1 were then added cautiously, again at room temperature, with slow stirring. The active carbon took up additional water from the suspension and the fibers from the suspension adhered to the surface of the granules. In this coating process, the active carbon remained free-flowing.

Thereafter, the granular active carbon coated in this way was treated for 4 minutes with a stream of air at 140° C. This in the first instance caused the water to evaporate from the active carbon. Thereafter, the temperature of the granular mass rose to 120° C. and crosslinking of the copolymer occurred. A coated granular active carbon, with a weight ratio of fibers to carbon of 5:95, was obtained. The adsorption and desorption properties of the coated active carbon virtually corresponded to those of the active carbon starting material, whilst the abrasion under mechanical load was unexpectedly reduced.

EXAMPLE 4

100 parts of an active carbon having a mean particle diameter of 4 mm and an inner surface area of 1,500 m$^2$/g were uniformly charged with 10 parts of water at room temperature, by spraying the water onto the surface of the carbon and gently stirring the latter. The water-treated active carbon was then treated with 65 parts of the 10% strength suspension 4. To do so, the granular active carbon was brought into contact with the suspension 4, while mixing gently. The active carbon rapidly took up the water and acquired a coating of the fibers of suspension 4. When all of the suspension 4 had been added, the granular active carbon still remained free-flowing. It was then heated, in a further process step, at 140° C. for 5 minutes by means of an infra-red heater; this initially caused the water to evaporate, followed by crosslinking of the copolymer constituting the fibers. A surface-consolidated active carbon in which the ratio of fibers to carbon was 7:93 was obtained. The abrasion of the coated active carbon was surprisingly less than that of the uncoated material, while the adsorption and desorption properties of the coated carbon were only slightly different from those of the uncoated carbon.

EXAMPLE 5

100 parts of an active carbon having a mean particle diameter of 4 mm and an inner surface area of 1,100 m²/g were treated with 15 parts of water at room temperature, while mixing well. 55 parts of suspension 5 were then added slowly at 23° C., while mixing constantly. The water of the suspension was spontaneously taken up by the granular active carbon, while the fibers adhered to the surface of the carbon. The resulting coated granular active carbon was then heated at 130° C. in a stream of air. This caused the water to evaporate, and the copolymer constituting the fibers to crosslink. A granular active carbon having a network-like coating was obtained, the surface being consolidated and the weight ratio of fibers to carbon being 5:95. The abrasion of this coated active carbon was surprisingly less than that of the untreated carbon, while the adsorption and desorption properties were virtually unchanged. Determination of the abrasion of granular active carbon 100 g of a virtually dry active carbon having a mean particle diameter of 4 mm and an inner surface area of 1,500 m²/g were introduced into a 1 liter cylinder. The cylinder was closed and allowed to rotate on a roller stand for 200 hours. After this time, the abrasion was determined by sieve analysis. Under these conditions, only 2% of the originally introduced granular active carbon remained unchanged.

The abrasion of a granular active carbon coated in accordance with Example 3 was determined by introducing 100 g of the coated material into a 1 liter cylinder, closing the latter, and then allowing it to rotate for 200 hours on a roller stand, at the same speed as in the preceding test. Thereafter, the abrasion was determined by sieve analysis. 98% of the originally employed granular material were found to be still unchanged. Test of toluene adsorbency A 1 liter adsorption tube was completely filled with a virtually dry active carbon which had a mean particle diameter of 4 mm and an inner surface area of 1,500 m²/g. A stream of air containing 1,000 ppm of toluene was then passed through the loose mass at room temperature. The granular active carbon took up 46% by weight of toluene. Thereafter, the granular active carbons whose surfaces had been consolidated as described in Examples 1 to 5 were successively tested for toluene adsorption. The results are summarized in the Table.

TABLE

Adsorption of toluene from a toluene-air mixture at 20° C., 4 mm diameter of adsorbent bed

| Granular active carbon according to Example No. | Adsorbency [%] | | Abrasion [%] | |
|---|---|---|---|---|
| | treated | untreated | treated | untreated |
| 1 | 42 | 44 | <2 | >98 |
| 2 | 40 | 40 | <2 | >98 |
| 3 | 40 | 46 | <2 | >98 |
| 4 | 41 | 44 | <2 | >98 |
| 5 | 35 | 38 | <2 | >98 |

We claim:
1. A process for consolidating the surface of a granular adsorbent, wherein the adsorbent, which initially contains virtually no water,
   (1) is treated, while being mixed, with an aqueous suspension containing from 1 to 30% by weight of filamentous thermoplastic structures of self-crosslinking copolymers, in such a way that the granular adsorbent takes up water from the suspension and at the same time the suspended filamentous structures deposit on the surface of the adsorbent, the latter remaining free-flowing,
   (2) the water taken up by the adsorbent is evaporated and
   (3) the adsorbent covered with the filamentous structures is heated at 110°–180° C. in order to crosslink the copolymer.

2. A process as claimed in claim 1, wherein the amount of the aqueous suspension of filamentous structures is so chosen, relative to the amount of adsorbent, that the degree of water saturation of the adsorbent is at most 80% by weight.

3. A process as claimed in claim 1, wherein the adsorbent, which initially contains virtually no water, is treated with from 1 to 20% of the maximum amount of water which it is able to take up.

4. A process as claimed in claim 1, wherein the self-crosslinking copolymer contains N-methylol groups and/or N-methylol-ether groups as copolymerized structures.

5. A process as claimed in claim 1, wherein the weight ratio of fibers to granular adsorbent is from 2:98 to 30:70.

* * * * *